US010375311B2

United States Patent
Zeise et al.

(10) Patent No.: US 10,375,311 B2
(45) Date of Patent: Aug. 6, 2019

(54) ANTI-ROTATION MOUNT

(71) Applicant: FLIR Systems, Inc., Wilsonville, OR (US)

(72) Inventors: Stephen W. Zeise, Ocoee, FL (US); Najat Hamri, Orlando, FL (US); James H. Weaver, West Linn, OR (US); Tylden Van Eeden, Tigard, OR (US); Robert D. Anderson, Orlando, FL (US)

(73) Assignee: FLIR Systems, Inc., Wilsonville, OR (US)

( * ) Notice: Subject to any disclaimer, the term of this patent is extended or adjusted under 35 U.S.C. 154(b) by 0 days.

(21) Appl. No.: 15/689,977

(22) Filed: Aug. 29, 2017

(65) Prior Publication Data

US 2018/0007248 A1  Jan. 4, 2018

Related U.S. Application Data

(63) Continuation of application No. 62/133,773, filed on Mar. 16, 2015.

(51) Int. Cl.
*H04N 5/232* (2006.01)
*G03B 15/00* (2006.01)
*G03B 17/56* (2006.01)
*H04N 5/225* (2006.01)
*B64D 47/08* (2006.01)

(52) U.S. Cl.
CPC ........... *H04N 5/2328* (2013.01); *B64D 47/08* (2013.01); *G03B 15/006* (2013.01); *G03B 17/561* (2013.01); *H04N 5/2252* (2013.01); *H04N 5/2253* (2013.01)

(58) Field of Classification Search
CPC .. H04N 5/2328; H04N 5/2253; H04N 5/2252; B64D 47/08; G03B 15/006; G03B 17/561
See application file for complete search history.

(56) References Cited

U.S. PATENT DOCUMENTS

| 2,506,095 A | 5/1950 | Mentz |
| 4,436,188 A * | 3/1984 | Jones ........................ B06B 3/00 188/378 |
| 8,385,065 B2 | 2/2013 | Weaver et al. |

(Continued)

FOREIGN PATENT DOCUMENTS

WO  WO 2012/170673  12/2012

*Primary Examiner* — Shahbaz Nazrul
(74) *Attorney, Agent, or Firm* — Haynes and Boone, LLP

(57) ABSTRACT

Imaging system comprising an anti-rotation mount and an image detector. The mount may comprise a first frame member having a fixed relation to a set of mutually transverse X, Y, and Z axes, and a second frame member. The second frame member may be connected to the first frame member via a coupling assembly, such that the frame members are not permitted to rotate relative to one another. The mount also may comprise X-axis, Y-axis, and Z-axis coupling structures each formed at least partially by the coupling assembly and each permitting axial motion of the frame members relative to one another only substantially parallel to the X axis, Y axis, and Z axis, respectively. The image detector may be connected to the mount via the second frame member.

20 Claims, 9 Drawing Sheets

(56) References Cited

U.S. PATENT DOCUMENTS

| | | | |
|---|---|---|---|
| 2007/0091488 A1* | 4/2007 | Grapov | G02B 7/004 359/876 |
| 2008/0292296 A1* | 11/2008 | Ryu | G03B 5/06 396/55 |
| 2012/0154614 A1* | 6/2012 | Moriya | G03B 3/10 348/208.5 |
| 2012/0316685 A1* | 12/2012 | Pettersson | F16F 3/00 700/275 |

* cited by examiner

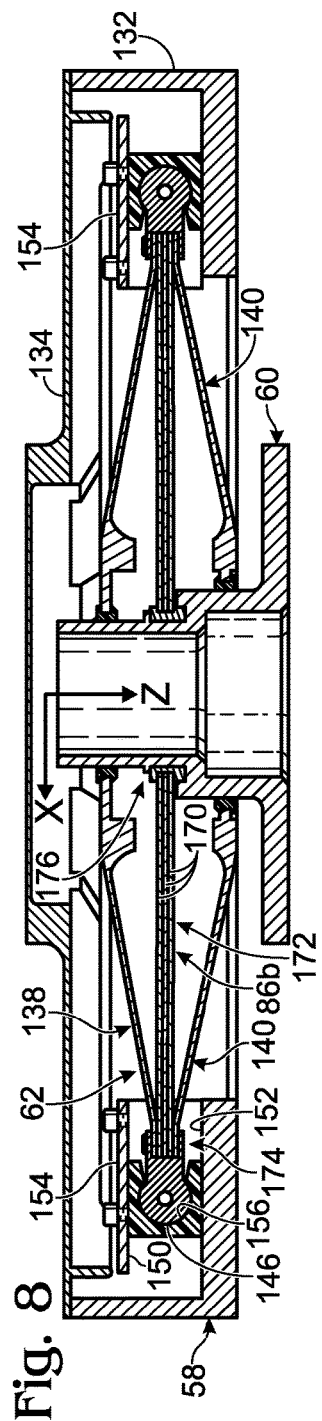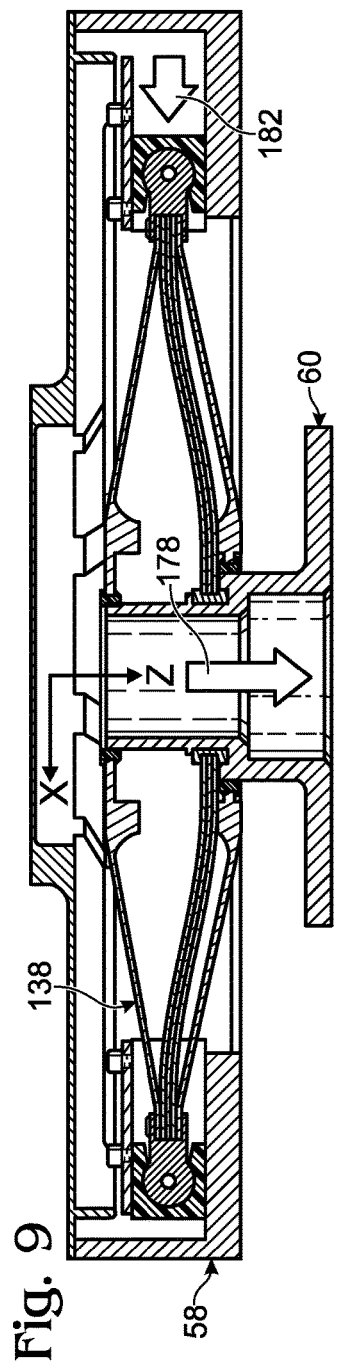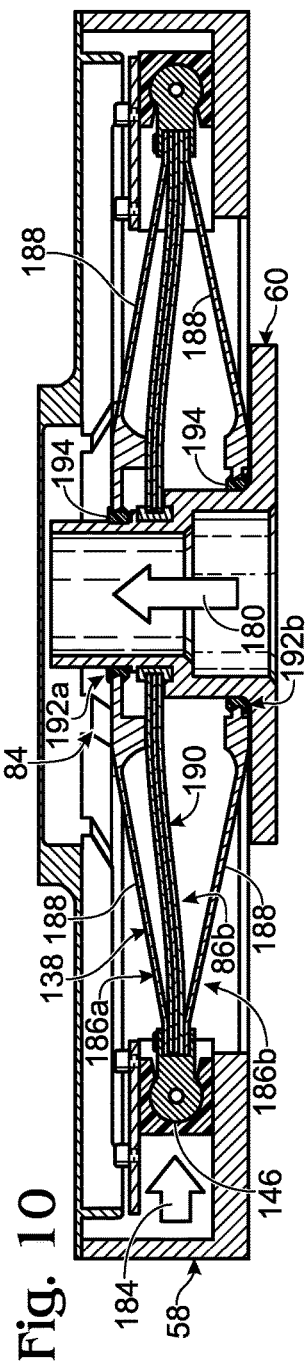

ANTI-ROTATION MOUNT

CROSS-REFERENCE TO RELATED APPLICATIONS

This application is a continuation of International Patent Application No. PCT/US2016/022705 PCT/EP2016/022705 filed Mar. 16, 2016 and entitled "ANTI-ROTATION MOUNT."

International Patent Application No. PCT/US2016/022705 filed Mar. 16, 2016 claims priority to and the benefit of U.S. Provisional Patent Application No. 62/133,773 filed Mar. 16, 2015 and entitled "ANTI-ROTATION MOUNT," which is hereby incorporated by reference in its entirety.

CROSS-REFERENCES TO OTHER MATERIALS

Each of the following patent documents is incorporated herein by reference in its entirety for all purposes: U.S. Pat. No. 8,385,065 B2, issued Feb. 26, 2013; and PCT Patent Application Publication No. WO 2012/170673 A1, published Dec. 13, 2012.

INTRODUCTION

An aircraft may be equipped with a gimbal system including a camera. The gimbal system enables the camera to be accurately pointed as the attitude and location of the aircraft changes during flight. Accordingly, the camera can be panned and tilted to survey a wide field of view or to monitor a specific target from the flying aircraft. The camera may provide a line of sight not available to the pilot and/or may detect optical radiation, such as infrared radiation, that is invisible to the human eye.

Aircraft vibration can degrade camera performance. Images from the camera can be unsteady and/or blurred if the field of view of the camera is not stabilized during flight. In particular, small, vibration-induced changes to the angular orientation of the camera, relative to the aircraft, can produce unacceptably large shifts in the field of view, especially if the camera is being used to view a distant target or scene.

The gimbal system may stabilize the camera through servomechanisms that include gyroscopes and motors. The servomechanisms can sense small, vibration-induced changes to the camera's orientation and actively apply compensating forces or movements to stabilize the camera. However, such active compensation may need to be applied with great accuracy, high gain, and considerable speed, to effectively stabilize the image when aircraft vibration is transmitted to the camera. As a result, active compensation can require sophisticated instrumentation and substantial power consumption and generally is effective only for low vibration frequencies.

A mounting system for a camera, whether or not aimable with gimbals, is needed to manage vibration from the aircraft and minimize vibration-induced rotational motion of the camera.

SUMMARY

The present disclosure provides an imaging system comprising an anti-rotation mount and an image detector. The mount may comprise a first frame member having a fixed relation to a set of mutually transverse X, Y, and Z axes, and a second frame member. The second frame member may be connected to the first frame member via a coupling assembly, such that the frame members are not permitted to rotate relative to one another. The mount also may comprise X-axis, Y-axis, and Z-axis coupling structures each formed at least partially by the coupling assembly and each permitting axial motion of the frame members relative to one another only substantially parallel to the X axis, Y axis, and Z axis, respectively. The image detector may be connected to the mount via the second frame member.

BRIEF DESCRIPTION OF THE DRAWINGS

FIG. 8 is a sectional view of the anti-rotation mount of FIG. 4, taken generally along line 8-8 of FIG. 6, but in the presence of the cover of the fixed frame member and in the absence of the coil springs, with coupling assembly in a neutral position.

FIGS. 9 and 10 are sectional views of the anti-rotation mount of FIG. 4, taken as in FIG. 8 and showing exemplary axial displacement of the movable frame member parallel to the X axis and the Z axis that is permitted and guided by X-axis and Z-axis coupling structures in response to force applied to the coupling assembly; the X-axis and Z-axis displacement is indicated by open arrows.

DETAILED DESCRIPTION

Figure 1:
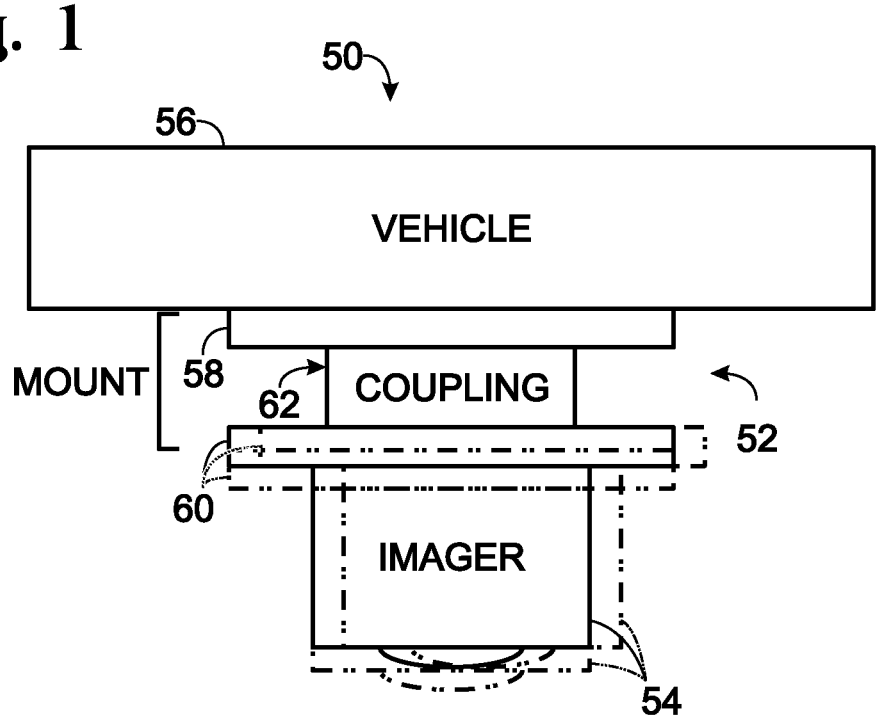
FIG. 1 is a schematic view of an exemplary imaging system including an anti-rotation mount (a mounting portion) through which an image detector is connected to a support platform (e.g., a vehicle), in accordance with aspects of the present disclosure.

The present disclosure provides an imaging system comprising an anti-rotation mount and an image detector. The mount may comprise a first frame member having a fixed relation to a set of mutually transverse X, Y, and Z axes, and a second frame member. The second frame member may be connected to the first frame member via a coupling assembly, such that the frame members are not permitted to rotate relative to one another. The mount also may comprise X-axis, Y-axis, and Z-axis coupling structures each formed at least partially by the coupling assembly and each permitting axial motion of the frame members relative to one another only substantially parallel to the X axis, Y axis, and Z axis, respectively. The image detector may be connected to the mount via the second frame member.

In some embodiments, the coupling assembly may include one or more leaf springs through which the frame members are connected to one another, with deformation of the leaf spring(s) allowing the frame members to move relative to one another parallel to the Z axis.

In some embodiments, the coupling assembly may include a plurality of pivotable members each arranged at least generally radially with respect to the Z axis and each having a first end and a second end, wherein the first ends of the pivotable members are pivotably connected to a same one of the frame members at respective single pivot axes arranged around and orthogonal to the Z axis and coplanar to one another, and wherein the second end of each pivotable member is connected to a portion of the X-axis coupling structure and/or a portion of the Y-axis coupling structure.

The present disclosure provides a passive mechanical means of limiting the effects of vibration modes and amplitude by a source (e.g., a vehicle) onto a system (e.g., an imaging system); this may be achieved by implementing two processes. First, the amplitude of the source vibration for any given frequency may be decreased through the use of damped mass spring systems. Second, the kinematic motion of frame members relative to one another may be limited to three perpendicular directions, significantly raising the natural frequencies for those modes which cause roll, pitch, or yaw.

The present disclosure is directed to the problem of external vibration being put into a system. Traditionally, dampers or isolators are used to limit the effects of vibration on a system; they allow a reduction in the amplitude of the input motion to be transferred through them. Unfortunately, they have limited control over the direction of the motion. The mount of the present disclosure may have internal features that isolate motion in only a few degrees of freedom. Of the six degrees of freedom, the rotational movements about the three perpendicular axes are of specific concern.

With a vibration managing mount, depending on the orientation of the system, motion could exist for which there are no internal system features to remove the motion. The present disclosure provide a mount having kinematic limits that specifically address the rotational movements of the system about three perpendicular axes. If all three rotational movements are limited or even eliminated, then the remaining degrees of freedom can be addressed by internal system features as well as features from external isolators and dampers.

As a simplified synopsis, the present disclosure may provide a system vibration isolator that uses kinematic limits to significantly constrain the three rotational degrees of freedom and may use a combination of damping solutions to address the remaining axial motion.

This present disclosure has at least two exemplary purposes, while at the same time optimizing height and weight requirements.

The first purpose may be to increase the first natural frequencies that are unique to cantilevered systems (pendulum modes). This is done by creating kinematic limits for the motion of the system in three perpendicular directions. The first direction may be vertical, or the nominal direction of gravity. This also may be the direction that defines the range of motion needs as it experiences the most significant amplitudes in vibration. The second and third directions may be transverse and longitudinal directions, and in most instances the system may be moving in some combination of both directions. By limiting the motion of frame members to three axial directions, the ability of the system to yaw, pitch, or roll is limited to that achieved by the deformation of the mount components and joints.

The second purpose may be to decrease the amplitude of the vibration to limit the effects of the vibration on the system. The smaller the amplitude, the less sway space is needed inside the system, thus allowing multiple layers of functional isolation. This decrease in the amplitude may be achieved by damping motion in the three above-mentioned axial directions.

The unique features that allow this mount to do what has been mentioned above may be a set of single-axis isolation features. The longitudinal and transverse horizontal directions may be isolated through a concept adapted from an Oldham coupling. Movement parallel to the directions is permitted without allowing rotation about the vertical axis. The vertical direction may be isolated by using the concept of two concentric cylinders, where one cylinder is constrained inside the other. This allows motion to only occur in the vertical direction and removes any rotation about the transverse or longitudinal axes. By layering these features in a manner where they do not contradict each other's movement, it is possible to create a mount that only moves parallel to predefined axes and does not rotate about any axis.

Further aspects of the present disclosure are described in the following sections: (I) definitions, (II) overview of exemplary imaging systems with an anti-rotation mount, (Ill) exemplary anti-rotation mounts, (IV) payloads, (V) support platforms, and (VI) selected embodiments.

I. Definitions

Technical terms used in this disclosure have the meanings that are commonly recognized by those skilled in the art. However, the following terms may have additional meanings, as described below. The wavelength ranges identified in these meanings are exemplary, not limiting, and may overlap slightly, depending on source or context. The wavelength ranges lying between about 1 nm and about 1 mm, which include ultraviolet, visible, and infrared radiation, and which are bracketed by x-ray radiation and microwave radiation, may collectively be termed optical radiation. The image detector disclosed herein may be configured to detect optical radiation of any suitable wavelength, including ultraviolet radiation, visible radiation, infrared radiation, or any combination thereof.

Ultraviolet radiation—Invisible electromagnetic radiation having wavelengths from about 100 nm, just longer than x-ray radiation, to about 400 nm, just shorter than violet light in the visible spectrum. Ultraviolet radiation includes (A) UV-C (from about 100 nm to about 280 or 290 nm), (B) UV-B (from about 280 or 290 nm to about 315 or 320 nm), and (C) UV-A (from about 315 or 320 nm to about 400 nm).

Visible light—Visible electromagnetic radiation having wavelengths from about 360 or 400 nanometers, just longer than ultraviolet radiation, to about 760 or 800 nanometers, just shorter than infrared radiation. Visible light may be imaged and detected by the human eye and includes violet (about 390-425 nm), indigo (about 425-445 nm), blue (about 445-500 nm), green (about 500-575 nm), yellow (about 575-585 nm), orange (about 585-620 nm), and red (about 620-740 nm) light, among others.

Infrared (IR) radiation—Invisible electromagnetic radiation having wavelengths from about 700 nanometers, just longer than red light in the visible spectrum, to about 1 millimeter, just shorter than microwave radiation. Infrared radiation includes (A) IR-A (from about 700 nm to about 1,400 nm), (B) IR-B (from about 1,400 nm to about 3,000 nm), and (C) IR-C (from about 3,000 nm to about 1 mm). IR radiation, particularly IR-C, may be caused or produced by heat and may be emitted by an object in proportion to its temperature and emissivity. Portions of the infrared range having wavelengths between about 3,000 and 5,000 nm (i.e., 3 and 5 μm) and between about 7,000 or 8,000 and 14,000 nm (i.e., 7 or 8 and 14 μm) may be especially useful in thermal imaging, because they correspond to minima in atmospheric absorption and thus are more easily detected (particularly at a distance). The particular interest in relatively shorter wavelength IR radiation has led to the following classifications: (A) near infrared (NIR) (from about 780 nm to about 1,000 nm), (B) short-wave infrared (SWIR) (from about 1,000 nm to about 3,000 nm), (C) mid-wave infrared (MWIR) (from about 3,000 nm to about 6,000 nm), (D) long-wave infrared (LWIR) (from about 6,000 nm to about 15,000 nm), and (E) very long-wave infrared (VL-WIR) (from about 15,000 nm to about 1 mm). Portions of the infrared range, particularly portions in the far or thermal IR having wavelengths between about 0.1 and 1 mm, alternatively or additionally may be termed millimeter-wave (MMV) wavelengths.

II Overview Of Exemplary Imaging Systems With An Anti-rotation Mount

Figure 2:
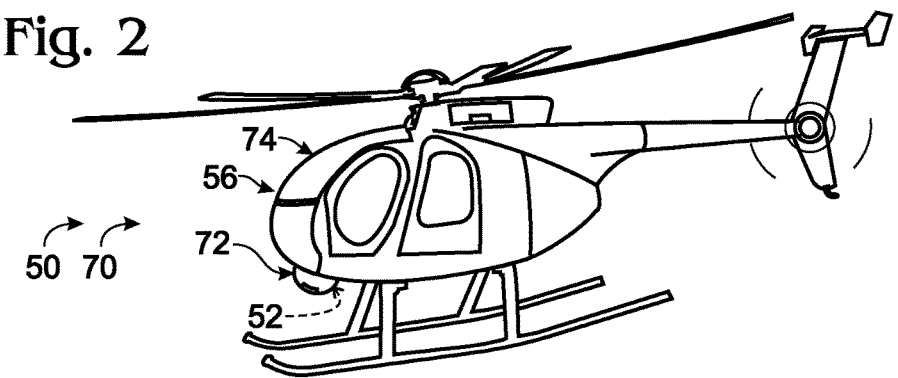
FIG. 2 is a view of an exemplary imaging system according to FIG. 1 that is constructed as a gimbal system including an independently aimable portion (a turret unit) containing an image detector, with the turret unit connected to an exterior of a support platform (here, a helicopter) via the anti-rotation mount of FIG. 1, in accordance with aspects of the present disclosure.
Figure 3:
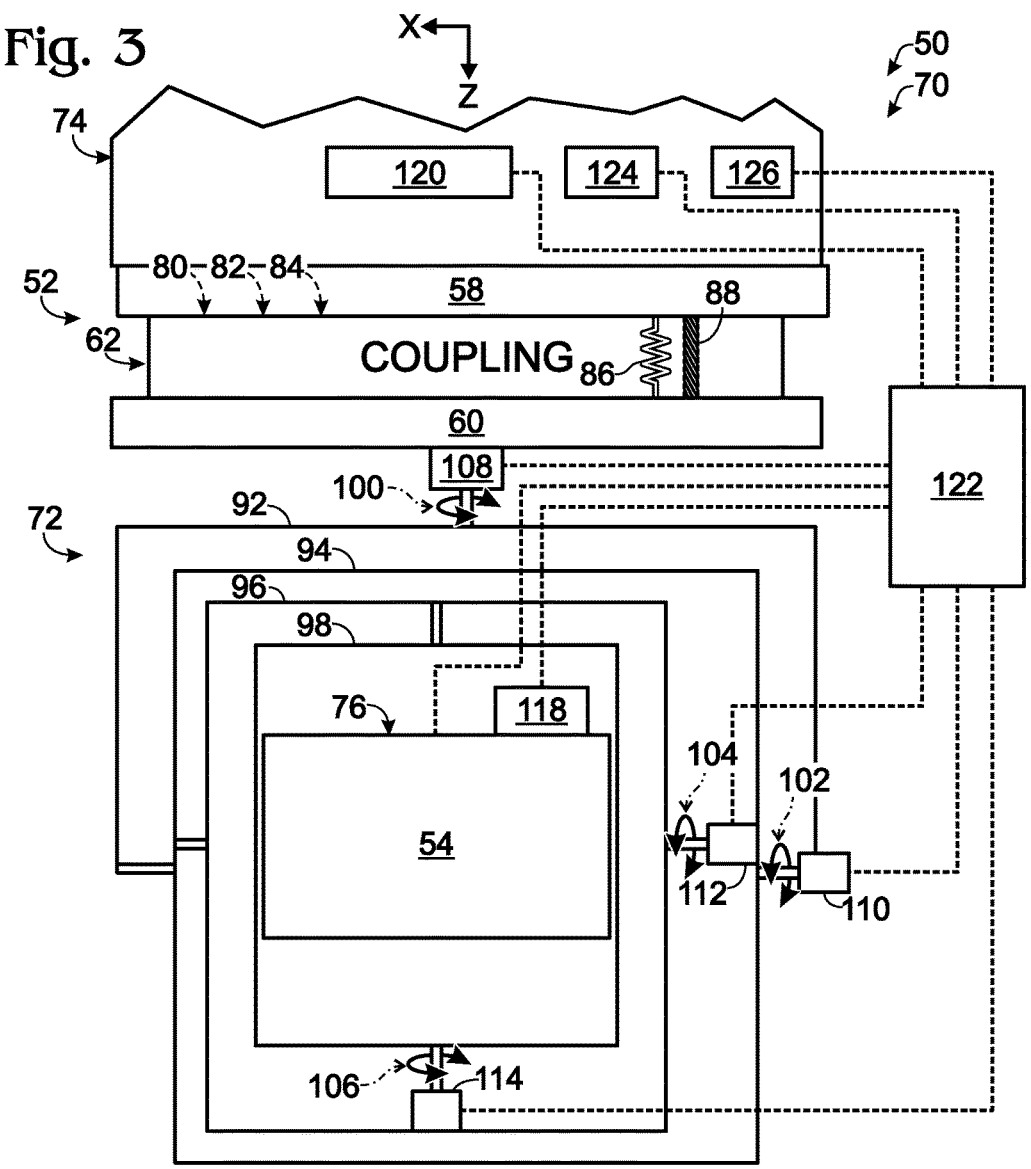
FIG. 3 is a schematic view of selected aspects of the gimbal system of FIG. 2, particularly the anti-rotation mount and the aimable portion, in accordance with aspects of the present disclosure.

This section describes exemplary imaging systems in which an image detector is connected to a support platform (e.g., a vehicle) via an anti-rotation mount; see FIGS. 1-3.

FIG. 1 shows an exemplary imaging system 50 including an anti-rotation mount 52 through which an image detector 54 (and/or other payload) may be connected to a support platform 56 (e.g., a vehicle). Mount 52 interchangeably may be termed a mounting portion and/or a translational mount. The anti-rotation mount includes a pair of frame members 58, 60 that are movably connected to one another via a coupling assembly 62 (also called a linkage assembly). Frame member 58 may be described as a fixed frame member that attaches the mount to platform 56 (e.g., such that frame member 58 is firmly attached to the platform). Frame member 60 may be described a movable frame member through which image detector 54 is connected to mount 52 and platform 56. Frame member 60 may be permitted, via coupling assembly 62, to move only translationally with respect to frame member 58. (Translational motion of image detector 54 and frame member 60 is indicated in phantom outline in FIG. 1.) The coupling assembly may resist rotational motion of the frame members relative to one another, to remove at least a pair or three degrees of rotational freedom of the frame members, while permitting at least two or three degrees of translational freedom of the frame members relative to each other. The mount also may serve as a mechanical filter to manage transmission of vibration and other variable forces from the support platform to the image detector, and to bias the position of the movable frame member with respect to the fixed frame member (and the platform) within a plane or within three-dimensional space (i.e., along three orthogonal axes).

FIG. 2 shows an example of imaging system 50 constructed as a gimbal system 70. The gimbal system contains a gimbal assembly 72 connected to the exterior of a vehicle 74 (here, a helicopter) via anti-rotation mount 52.

FIG. 3 shows a schematic view of selected aspects of gimbal system 70. Gimbal assembly 72 may be connected to and supported by mount 52 (e.g., below or above the mount, among others) and pivotable collectively with respect to the mount (and the vehicle). At least a portion of the mount may be relatively stationary with respect to vehicle 74, and the gimbal assembly may be relatively movable with respect to the vehicle. System 70 also may be equipped with a payload 76 (e.g., including at least one or more optical devices, such as at least one image detector 54 (also called a camera)) that is orientable with respect to mount 52 (and the vehicle) by rotation of gimbals of gimbal assembly 72 about a plurality of axes (e.g., at least two nonparallel axes and/or a pair of orthogonal axes).

Mount 52 includes frame members 58, 60. In some cases, the frame members may be positioned as an upper frame member (58 or 60) and a lower frame member (60 or 58), which may be separated from one another along an axis (e.g., at least generally parallel to the indicated Z-axis, which may or may not be at least generally vertical). For example, here, frame member 58 is an upper frame member through which the mount is secured to vehicle 74, and frame member 60 is a lower frame member. However, the frame members may switch their relative positions if the gimbal assembly is mounted above the vehicle, with frame member 58 adjacent the vehicle. More generally, the frame members may be separated from each other along any axis determined, for example, by how the mount is attached to a support platform. In any event, fixed frame member 58 may firmly attach the mount to vehicle 74, and movable frame member 60 may connect the mount to gimbal assembly 72.

Frame member 58 may be secured to a support platform via attachment features of the frame member. For example, the frame member may define a set of apertures to receive fasteners. The apertures may have any suitable position, such as being disposed generally centrally or near a perimeter of the frame member.

Frame member 58 may define and/or have a fixed relation to a set of three mutually transverse axes (e.g., orthogonal axes), designated herein as X, Y, and Z for convenience. In some embodiments, with mount 52 secured to a vehicle, the X axis is parallel to a fore-aft or longitudinal axis of the vehicle, the Y axis is parallel to a left-right lateral or transverse axis of the vehicle, and the Z axis points downward from the vehicle. Accordingly, the Z axis may be approximately aligned with gravity during operation of the vehicle. The Z axis may be coaxial with a central axis defined by the mount, and the central axis may extend through both frame members. The drawings of the present disclosure show an XYZ coordinate system oriented according to this convention, with some translational offset of the coordinate system occurring among the drawings for convenience.

Frame members 58, 60 may be connected movably to one another through a coupling assembly 62. The coupling assembly may permit zero degrees of rotational freedom for the frame members relative to one another. In other words, the coupling assembly may resist rotation of the frame members relative to one another about any axis, such that no substantial rotation occurs. However, the coupling assembly may allow three degrees of translational freedom for movement of the frame members relative to one another.

Coupling assembly 62 may at least partially form X-axis coupling structure 80, Y-axis coupling structure 82, and Z-axis coupling structure 84. Each coupling structure 80, 82, and 84 may guide and permit translational motion of the frame members relative to one another only substantially parallel to the X axis, Y axis, and Z axis, respectively, of a set of mutually transverse axes. The coupling structures may function independently of one another. X-axis, Y-axis, and Z-axis coupling structures may include respective X-axis, Y-axis, and Z-axis slide structures.

Each slide structure may include at least one or a plurality of slide interfaces at which discrete components move translationally relative to one another. Each slide interface may be formed at least in part by coupling assembly 62 and each may have only one degree of axial freedom. Each slide interface may permit axial motion of the frame members relative to one another only parallel to one of three mutually transverse axes (X, Y, or Z). One or more of the slide interfaces may be X-axis interfaces that at least partially form X-axis coupling structure 80 for motion parallel to the X axis. One or more of the slide interfaces may be Y-axis interfaces that at least partially form Y-axis coupling structure 82 for motion parallel to the Y axis. One or more of the slide interfaces may be Z-axis interfaces that at least partially form Z-axis coupling structure 84 for motion parallel to the Z axis. Further aspects of exemplary coupling structures and slide interfaces are described below in Section III.

Coupling assembly 62 may include one or more biasing members 86, and/or one or more dampers 88 to dampen vibrations (e.g., to dissipate kinetic energy as heat). Biasing members 86 (also called spring elements or isolators) may be any resilient/elastic members that apply a restoring force when the frame members are displaced relative to one another from an equilibrium or resting position, to urge the frame members back toward the equilibrium/resting position. The biasing members may cushion gimbal assembly 72 from shocks and may filter vibrations of the vehicle according to frequency (e.g., a low-pass filter that blocks higher-frequency vehicle vibration), to limit transmission of vibration from the vehicle to the gimbal assembly. Biasing members 86 may be disposed at any suitable number of locations between frame members 58, 60. The biasing members may be configured to resiliently position frame member 60 (and image detector 54) along each of three mutually transverse axes. Exemplary biasing members include coil springs and leaf springs, among others.

Gimbal assembly 72 may comprise a series of two or more gimbals, such as first through fourth gimbals 92, 94, 96, and 98. Each gimbal is pivotably connected to preceding and succeeding gimbals of the series, for example, via one or more axles. First gimbal 92 supports second through fourth gimbals 94, 96, and 98 and payload 76 and is pivotably connected to and supported by frame member 60 for rotation about a first axis 100 (e.g., a first yaw, azimuthal, and/or vertical axis), which may extend at least generally centrally through mount 52 and/or one or both frame members 58, 60. Second gimbal 94 supports third and fourth gimbals 96, 98 and payload 76 and is pivotably connected to and supported by first gimbal 92 for rotation about a second axis 102 (e.g., a first pitch, elevational, and/or horizontal axis), which may be orthogonal to first axis 100. Third gimbal 96 supports fourth gimbal 98 and payload 76 and is pivotably connected to and supported by second gimbal 94 for rotation about a third axis 104 (e.g., a second pitch, elevational, and/or horizontal axis). Third axis 104 may be parallel to, and/or coaxial with second axis 102 (or first axis 100 with the gimbal assembly in a neutral position). Fourth gimbal 98 supports payload 76 and is pivotably connected to and supported by third gimbal 96 for rotation about a fourth axis 106 (e.g., a second yaw, azimuthal, and/or vertical axis). Fourth axis 106 may be parallel to, and/or coaxial with first axis 100 (or second axis 102) with the gimbal assembly in a neutral position. The payload may (or may not) be fixed to the fourth gimbal. In some cases, rotation of first and second gimbals 92, 94 may provide larger adjustments to the orientation of payload 76, and rotation of third and fourth gimbals 96 and 98 may provide smaller adjustments to the orientation (or vice versa).

Rotation of each gimbal 92, 94, 96, and 98 may be driven by a corresponding motor 108, 110, 112, and 114, respectively. Each motor may be attached to its corresponding gimbal or to the structure that supports the gimbal, or a combination thereof. For example, motor 108 may be attached to frame member 60 or first gimbal 92; motor 110 to first gimbal 92 or second gimbal 94; and so on. Accordingly, the angular orientation of the payload may be adjusted horizontally and vertically via rotation of gimbals 92, 94, 96, and 98, without changing the orientation of the support platform, and/or the payload may continue to point at a target as the attitude and location of the support platform changes, among others. Accordingly, the gimbal system may allow one or more fixed and/or moving targets to be monitored or tracked over time from a fixed and/or moving support platform.

The gimbal system also may comprise one or more sensors to sense aspects of the vehicle, one or more gimbals, the payload, or a target. Exemplary sensors include an orientation sensor (e.g., a gyroscope that measures angular position or rate of angular change, among others), an accelerometer, an optical sensor to detect optical radiation (e.g., image detector 54), or the like. At least one gimbal of the gimbal assembly and/or the payload may be attached to at least one gyroscope 118 to measure the orientation of the gimbal and/or payload. In some cases, the gimbal system may include at least one inertial measurement unit (IMU) 120, which may be carried by gimbal assembly 72 (e.g., by payload 76 or fourth gimbal 98), and/or vehicle 74. The IMU includes sensors to measure acceleration along three orthogonal axes and angular position/change about three orthogonal axes. Measurements from unit 120 alone or in combination with those from one or more other gyroscopes of the gimbal assembly may be used to aim the payload with respect to an inertial reference frame (e.g., the earth), as the vehicle travels with respect to the reference frame.

Gimbal system 70 also may comprise a processor 122, and a user interface 124 to communicate user preferences, commands, etc., to the processor. The processor may be included in gimbal assembly 72 (and/or mount 52), vehicle 74, or a combination thereof, among others. The user control unit may be disposed in the vehicle, if the vehicle has a person onboard, or may be disposed elsewhere (e.g., on the ground) if the vehicle is unmanned.

The processor may include any electronic device or set of electronic devices responsible for signal processing, manipulation of data, and/or communication between or among gimbal system components. The processor may be localized to one site or may be distributed to two or more spaced sites of the gimbal system. The processor may be programmed to receive user inputs from user interface 124 and to control operation of and/or receive signals from any suitable system components, as indicated by dashed lines in FIG. 3, for example, the motors, sensors (e.g., one or more optical devices, an IMU(s), gyroscopes, accelerometers, etc.), payload 76, a display 126 carried by vehicle 74, and so on. Accordingly, the processor may be in communication with the motors, sensors, and display, to receive signals from and/or send signals to these devices, and may be capable of controlling and/or responding to operation of these devices. Also, the processor may be responsible for manipulating (processing) image data (i.e., a representative video signal) received from image detector 54 before the signal is communicated to display 126, to drive formation of visible images by the display.

Gimbal assembly 72 may include and/or be connected to a power supply. The power supply may include any mechanism for supplying power, such as electrical power, to the motors, sensors, camera, processor, etc. The power supply may be provided by the support platform, the mount, the gimbal apparatus, or a combination thereof, among others. Suitable power supplies may generate, condition, and/or deliver power, including AC and/or DC power, in continuous and/or pulsed modes. Exemplary power supplies may include batteries, AC-to-DC converters, DC-to-AC converters, and so on.

III. Exemplary Anti-rotation Mounts

This section describes exemplary anti-rotation mounts 52 that may be included in the imaging/gimbal systems of Section II; see FIGS. 4-18.

FIGS. 4-13 show an exemplary embodiment 130 of anti-rotation mount 52 taken in isolation from the gimbal assembly and image detector of gimbal system 70 (also see FIGS. 2 and 3). A coordinate system defined by a set of mutually orthogonal X, Y, and Z axes and generally centered in the mount is shown in the figures. However, the coordinate system is translationally shifted among the figures for convenience.

Figure 4:
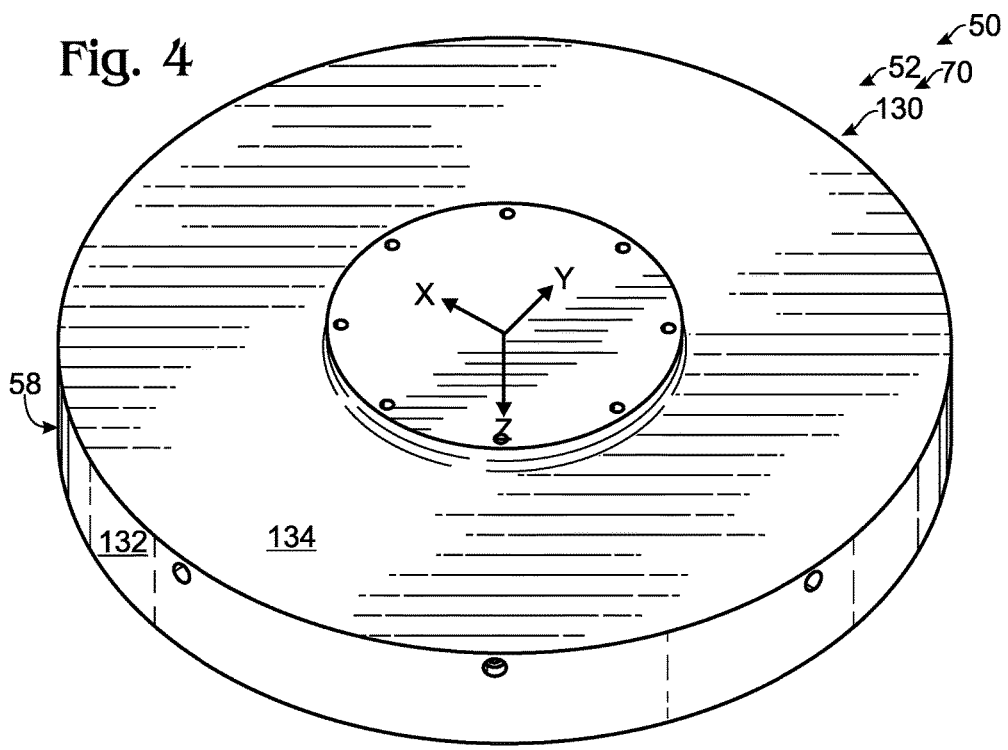
FIG. 4 is an isometric view of an exemplary anti-rotation mount for the gimbal system of FIG. 2 (and/or the imaging system of FIG. 1), taken in isolation from the turret unit of the gimbal system and from generally above a fixed frame member of the mount that is securable to a vehicle or other support platform.
Figure 5:
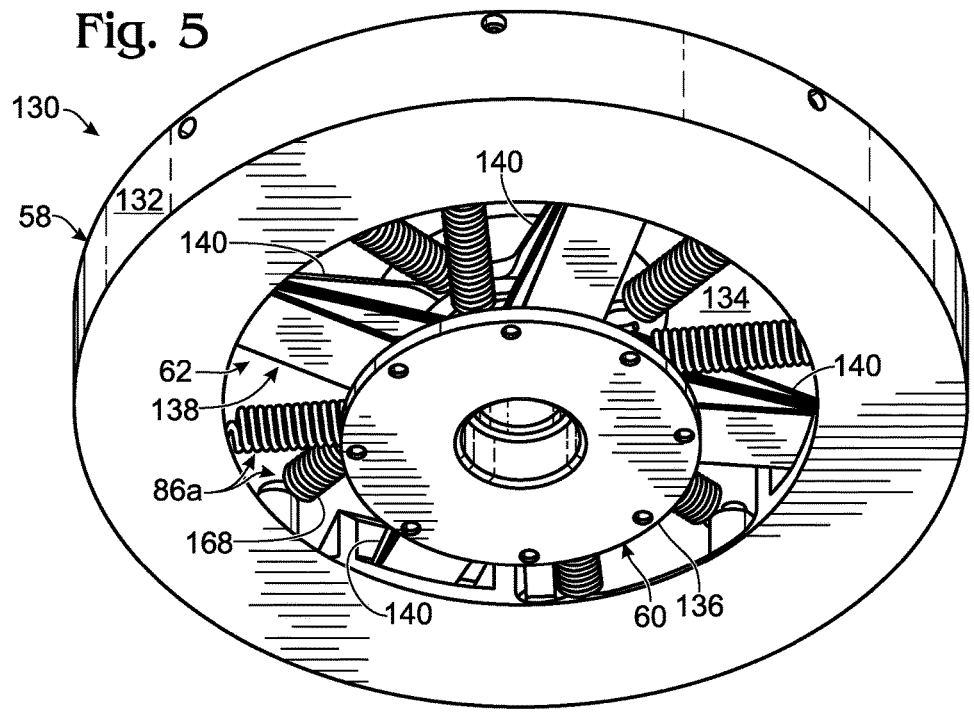
FIG. 5 is another view of the anti-rotation mount of FIG. 4 taken in isolation from the turret unit of the gimbal system and from generally below a movable frame member of the mount that mounts to and supports the turret unit of the gimbal system.

Mount 130 includes an upper frame member 58 that mounts to a vehicle or other support platform (see FIGS. 4 and 5). Frame member 58 has a fixed relationship to the XYZ coordinate system shown. The fixed frame member may include a base 132 and a cover 134. The cover may be secured to the base to form a housing in which a coupling assembly 62 may be at least predominantly contained (see FIG. 5). The mount also has a lower frame member 60 movably connected to upper frame member 58 via coupling assembly 62. The lower frame member may provide a bracket 136 that connects to and supports a gimbal assembly and/or an image detector.

Figure 6:
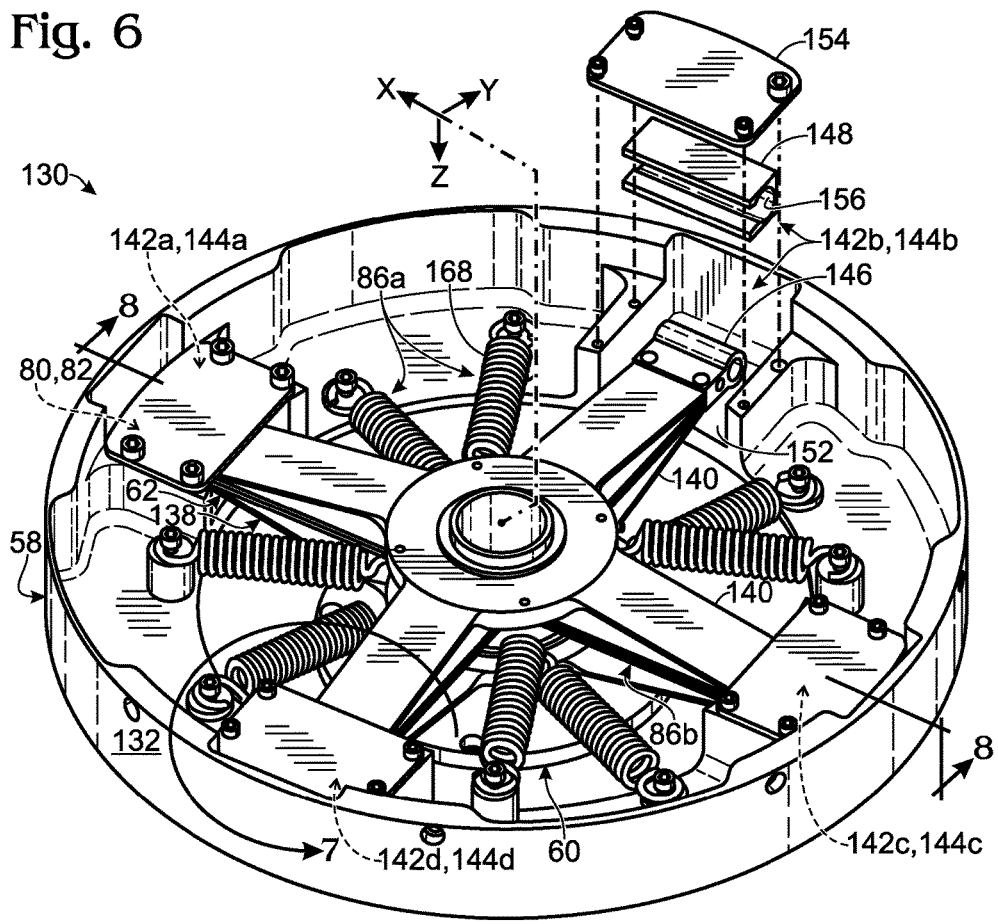
FIG. 6 is a partially exploded view of the anti-rotation mount of FIG. 4, taken generally as in FIG. 4 with a cover of the fixed frame member removed.

Coupling assembly 62 may include a body 138 attached to and extending radially from movable frame member 60 to form at least four radial extensions or arms 140 (see FIGS. 5 and 6). The body may be movable with respect to fixed frame member 58 parallel to the XY plane, due to the presence of X-axis coupling structure 80 and Y-axis coupling structure 82 (see FIG. 6). X-axis coupling structure 80 of mount 130 may be described as an X-axis slide structure formed by a plurality of X-axis slide interfaces 142a-142d. Y-axis coupling structure 82 of mount 130 may be described as a Y-axis slide structure formed by a plurality of Y-axis slide interfaces 144a-144d. Each interface 142a-142d and 144a-144d may be formed near or at the end of one of arms 140 of body 138. The depicted embodiment has four X-axis slide interfaces and four Y-axis slide interfaces. Each X-axis slide interface permits axial motion of the frame members relative to one another only substantially parallel to the X axis. Each Y-axis slide interface permits axial motion of the frame members relative to one another only substantially parallel to the Y axis. The range of motion permitted by the X-axis slide interfaces and the range of motion permitted by the Y-axis slide interfaces are additive with each other, collectively determining the range of motion permitted parallel to the XY plane. Each slide interface also may be called a translational coupling.

Figure 7:
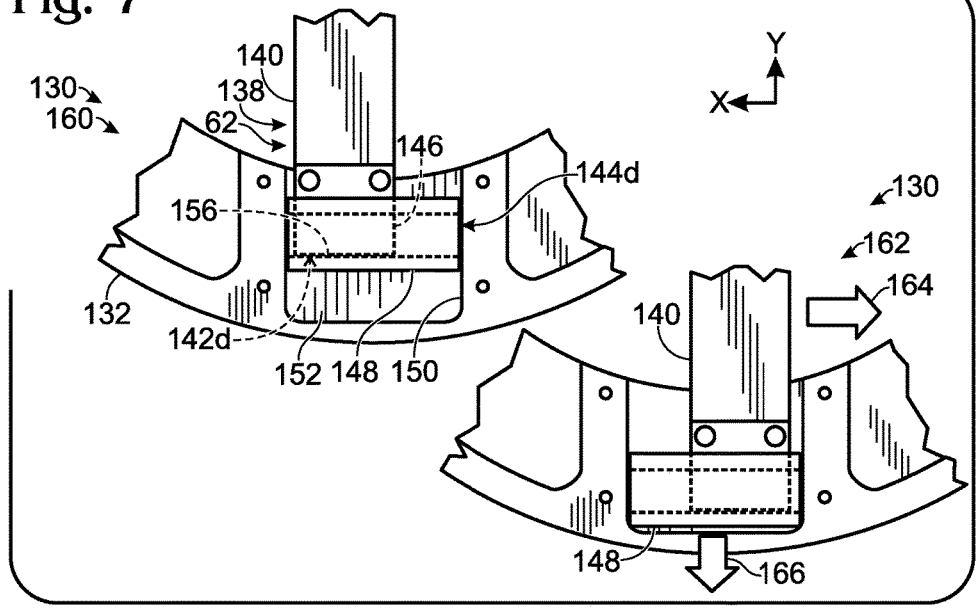
FIG. 7 is a pair of fragmentary plan views of the anti-rotation mount of FIG. 4, taken generally at the region indicated at "7" in FIG. 6, with the cover and one of the plates of the fixed frame member removed, and with a coupling assembly of the mount in two different configurations.

FIGS. 6-8 show further aspects of each associated pair of X-axis and Y-axis interfaces (i.e., 142a/144a, 142b/144b, 142c/144c, and 142d/144d). Each associated pair of slide interfaces may be formed by a radially-outer end portion 146 of one of arms 140 of body 138, a slidable element 148, and a radial track 150. Slidable element 148 may be considered to be part of coupling assembly 62 but not body 138. Radial track 150 may be formed by frame member 58. In the depicted embodiment, each radial track 150 is created by a recess 152 defined by base 132, and a plate 154 that is fastened to the base over the recess (see FIGS. 6 and 8). Plate 154 is absent from FIG. 7.

Each arm 140 of body 138 may be mated with a slidable element 148 such that end portion 146 is slidable along a complementary tangential track 156 defined by the slidable element. In the depicted embodiment, end portion 146 forms an enlarged protrusion (here, cylindrical) and is slidably received in a channel that creates tangential track 156. The channel is shaped to retain the protrusion; arm 140 and slidable element 148 remain coupled to one another through the entire range of motion of the coupling assembly. The mated end portion 146 of arm 140 is slidable along track 156 parallel to the XY plane, in both tangential directions orthogonal to the axis of the corresponding arm 140 (i.e., either parallel to the X axis or parallel to the Y axis). In other embodiments, end portion 146 may define a recess that mates with a protruding tangential track defined by slidable element 148.

Slidable element 148 fits closely in radial track 150 such that the element is slidable along only a single axis defined by the track (i.e., parallel to the X axis or parallel to the Y axis and orthogonal to the direction of motion permitted by track 156 of the slidable element). Since slidable element 148 is coupled to the end of one of arms 140, radial motion of the slidable element is coupled to corresponding motion of body 138 and movable frame member 60.

Each pair of tracks 150, 156 permits two-dimensional motion parallel to the XY plane. In other embodiments, the pair of tracks may be arranged transverse (e.g., orthogonal) to one another and parallel to the XY plane, but are not necessarily radial and tangential.

FIG. 7 shows a pair of exemplary configurations 160, 162 of mount 130 illustrating how X-axis slide interface 142*d* and Y-axis slide interface 144*d* permit independent movement of arm 140 of coupling assembly 62 parallel to the X axis and parallel to the Y axis. To move from configuration 160 to configuration 162, arm 140 undergoes net displacement parallel to the X axis, indicated by a motion arrow at 164, via X-axis slide interface 142*d*. In other words, end portion 146 slides along tangential track 156 of slidable element 148. Also, arm 140 undergoes net displacement parallel to the Y axis, indicated by a motion arrow at 166, via X-axis slide interface 144*d*. In other words, slidable element 148 moves radially along radial track 150.

The pairs of associated X-axis and Y-axis slide interfaces may be substantial copies of one another. In other words, each arm 140 may be mated with a slidable element 148, which may be slidable radially along a radial track 150. However, because two of the associated pairs are rotationally offset by 90 degrees from the other two associated pairs, the axial identity of structurally similar interfaces is switched. In other words, X-axis slide interfaces 142*b* and 142*d* are formed by end portions 146 and tangential tracks 156, while X-axis slide interfaces 142*a* and 142*c* are formed by slidable elements 148 and radial tracks 150. Also, Y-axis slide interfaces 144*a* and 144*c* are formed by end portions 146 and tangential tracks 156, while Y-axis slide interfaces 144*b* and 144*d* are formed by slidable elements 148 and radial tracks 150.

The slide interfaces may be formed by any suitable materials. For example, slidable element 148 may include a low-friction polymer and may contact polymer and/or metal, among others, at an X-axis slide interface and a Y-axis slide interface.

The positions of body 138 and movable frame member 60 are biased in a plane parallel to the XY plane, namely, along an axis parallel to the X axis and along an axis parallel to the Y axis, by a plurality of biasing members 86*a*. In the depicted embodiment, these biasing members are coil springs 168 (see FIGS. 5 and 6).

Body 138 may include at least one Z-axis biasing member 86*b* that is deformable to permit axial motion of the frame members relative to one another parallel to the Z axis, independently of axiar motion parallel to the X and Y axes (see FIGS. 6 and 8). Z-axis biasing member 86*b* may, for example, include one or more resiliently/elastically deformable plates 170 (see FIG. 8). In the depicted embodiment, biasing member 86*b* includes at least one leaf spring 172, which is an assembly (e.g., a stack) of two or more resiliently/elastically deformable plates facing one another. Each deformable plate 170 and/or each leaf spring 172 may be arranged substantially orthogonal to the Z axis.

Each arm 140 of body 138 may contain at least a portion of one or more deformable plates 170 and/or at least a portion of a leaf spring 172. In some embodiments, each arm 140 may include a separate deformable plate 170 and/or leaf spring 172. In some embodiments, as described further below in this section, two or more arms (e.g., all of the arms) may share one or more deformable plates 170 and/or at least one leaf spring 172.

Each deformable plate 170 or leaf spring 172 may be attached (e.g., firmly) to an end portion 146 of at least one arm 140, indicated by an arrow at 174, and attached (e.g., firmly) to movable frame member 60, indicated by an arrow at 176 (see FIG. 8). A radially-outer edge of the deformable plate or leaf spring may be attached to end portion 146, and a radially-inner edge of the deformable plate or leaf spring may be attached to frame member 60. The plate or leaf spring may deform in a region between the inner and outer edges when the frame members move relative to one another parallel to the Z axis, indicated by downward and upward motion arrows 178, 180 in FIGS. 9 and 10.

Body 138 also may move as a unit parallel to the X axis and parallel to the Y axis, independently of and optionally concurrently with the Z axis motion. For example, FIGS. 9 and 10, when compared with FIG. 8, show body 138 and movable frame member 60 displaced in opposite directions parallel to the X axis, indicated by motion arrows at 182 and 184. The body and movable frame member may be displaced parallel to the Y axis (i.e., orthogonal to the section plane of FIGS. 8-10), independently of and optionally concurrently with the X axis and Z axis displacement shown.

Body 138 may include one or more brace assemblies (e.g., upper and lower brace assemblies 186*a*, 186*b*), which may guide and/or limit deformation of Z-axis biasing member(s) 86*b* (see FIG. 10). Each brace assembly is configured to be substantially more rigid than biasing member(s) 86*b*. Each brace assembly may include a plurality of support members 188 each forming an upper or lower part of one of arms 140. Each support member 188 may be arranged obliquely to a deformable portion 190 of the arm, with the deformable portion created by one or more biasing members 86*b*. The deformable portion may be located intermediate upper and lower support members 188 of the arm. The support members may extend divergently from end portion 146 of arm 140 toward movable frame member 60. A radially-outer edge region of each support member may be attached (e.g., firmly) to end portion 146 of an arm 140. A radially-inner edge region of each brace assembly 186*a*, 186*b* may slidably interface with movable frame member 60 at a respective Z-axis slide interface 192*a*, 192*b*. Biasing member(s) 86*b*, supports 188, and Z-axis slide interfaces 192*a*, 192*b* collectively form Z-axis coupling structure 84, which permits and guides motion of movable frame member 60 parallel to the Z axis, while preventing motion of frame member 60 that would allow it to tilt/rock out of alignment with the Z axis. The brace assemblies may function to limit deformation of biasing member(s) 86*b* to symmetrical modes, thereby substantially eliminating any rocking motion of the movable frame member that could be produced by asymmetrical deformation of biasing member(s) 86*b*.

Each brace assembly 186*a*, 186*b* may include a respective bearing 194 that contacts movable frame member 60 (see FIG. 10). The bearings may be described as anti-rock bearings. Each bearing 194 may be disposed around a cylindrical region of frame member 60.

Figure 11:
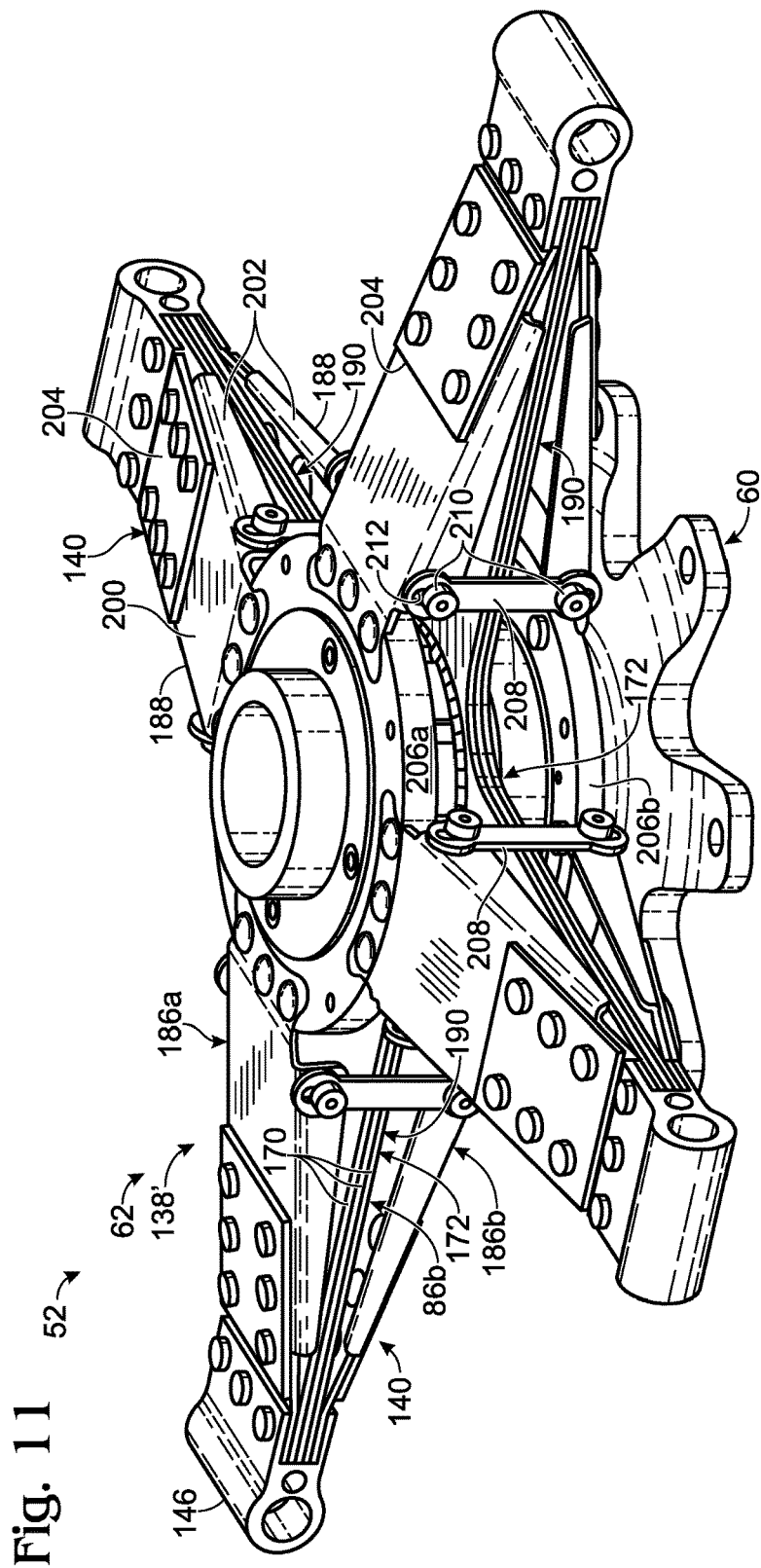
FIG. 11 is an isometric view of selected aspects of another exemplary body and movable frame member for the anti-rotation mount of FIG. 4, in accordance with aspects of the present disclosure.
Figure 12:
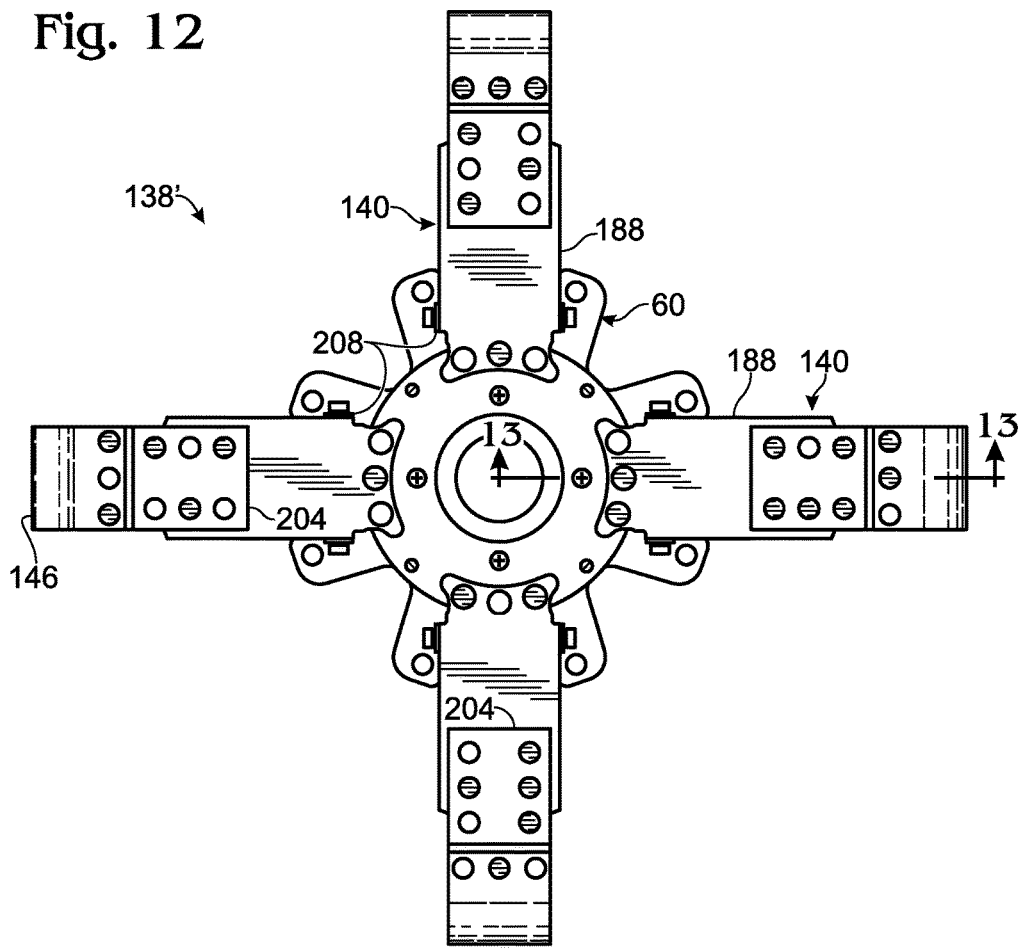
FIG. 12 is a plan view of the body and frame member of FIG. 11.
Figure 13:
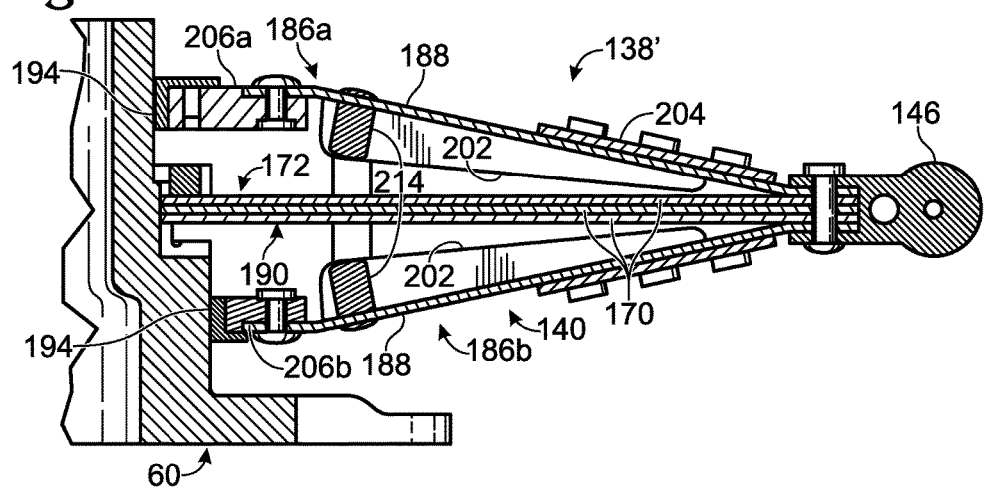
FIG. 13 is a fragmentary sectional view of the body and frame member of FIG. 11, taken generally along line 13-13 of FIG. 12.
Figure 14:
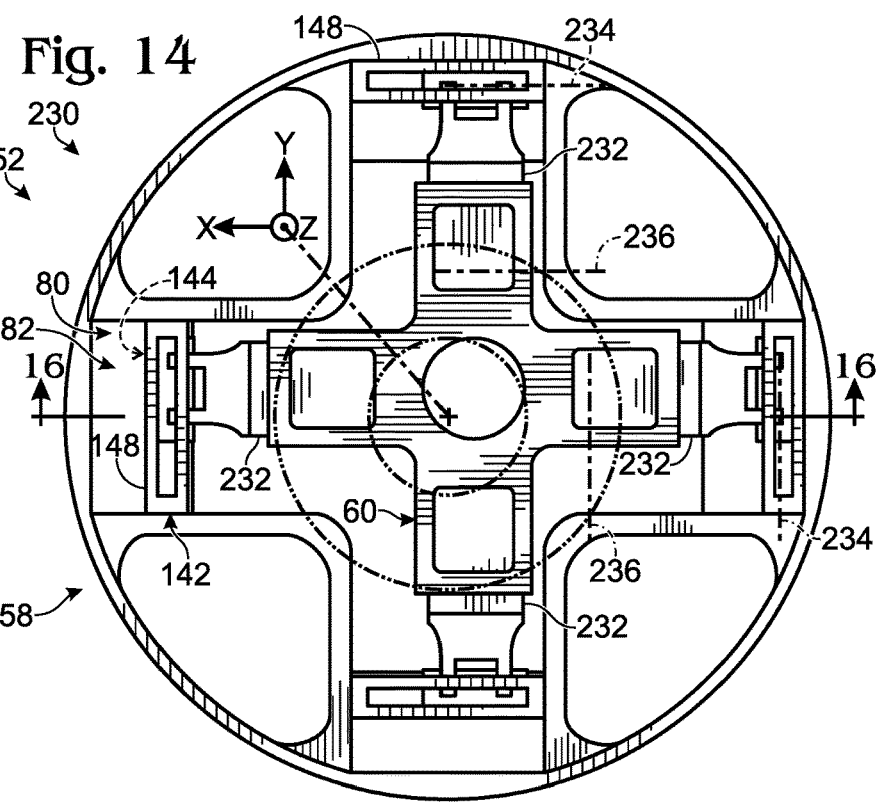
FIG. 14 is a plan view of selected aspects of another exemplary anti-rotation mount for the imaging system of FIG. 1 (and the gimbal system of FIG. 2), in which a movable frame member is connected to a fixed frame member via a plurality of radially arranged pivotable members.
Figure 15:
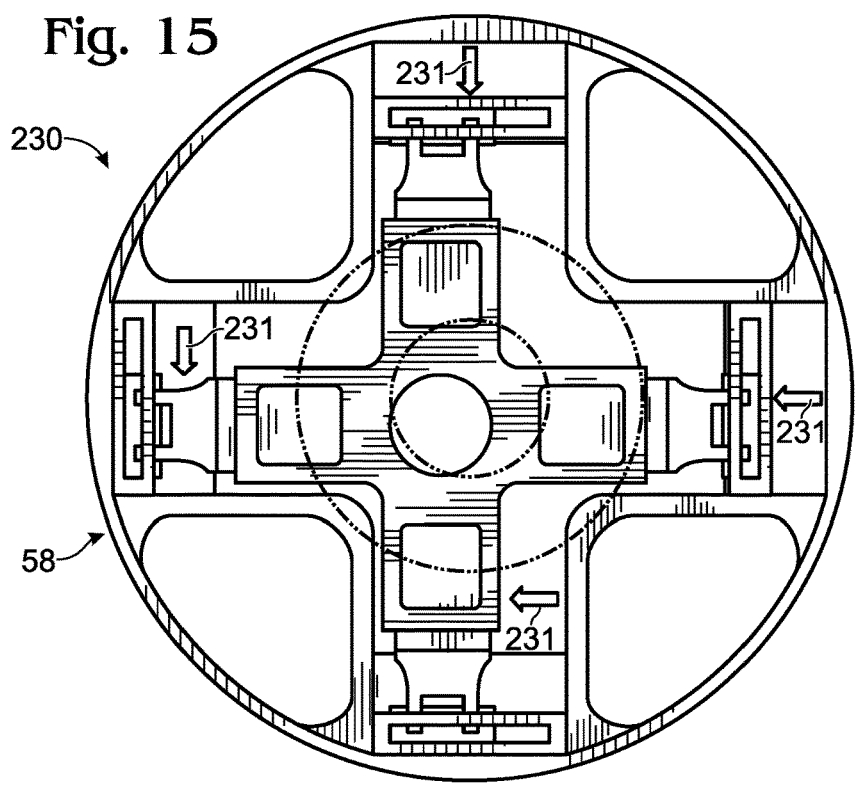
FIG. 15 is another plan view of the mount of FIG. 14, but taken after displacement of the movable frame member relative to the fixed frame member parallel to the X axis and parallel to the Y axis, with motion parallel to the X-axis and motion parallel to the Y-axis motion guided by X-axis coupling structure and Y-axis coupling structure similar to that present in the mount of FIGS. 4-10.
Figure 16:
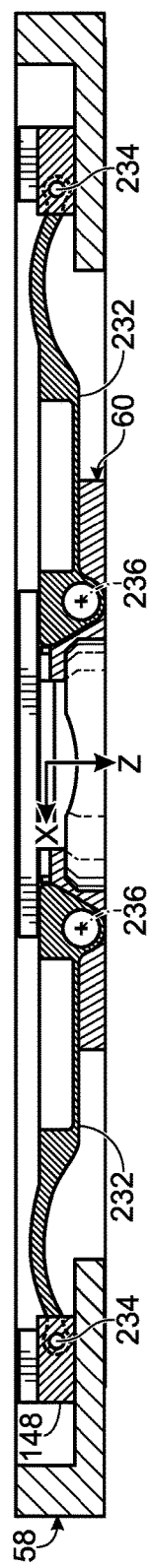
FIGS. 16-18 are sectional views of the mount of FIG. 14, taken generally along line 16-16 of FIG. 14 (except with the coupling assembly and movable frame member centered within their range of permitted X-axis motion), and showing mount configurations produced by motion of the movable frame member along the Z axis.
Figure 17:
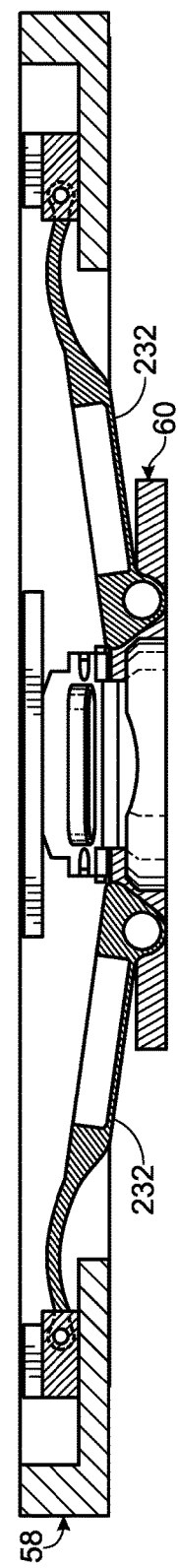
Figure 18:
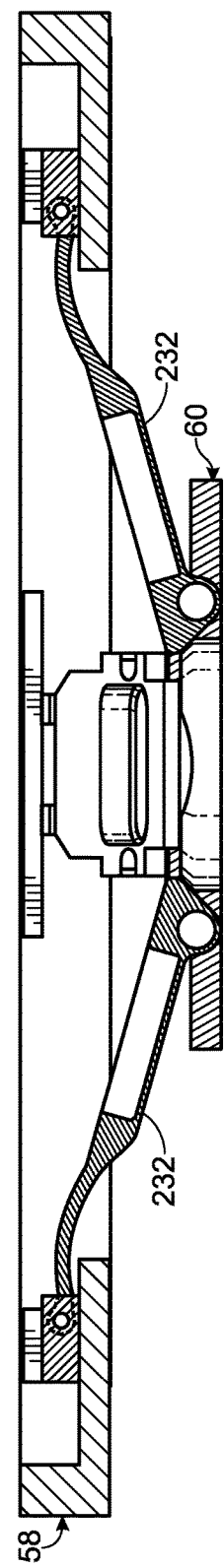

FIGS. 11-13 show another exemplary body 138' and movable frame member 60 for mount 130 (also see FIGS. 4-10). Body 138' is similar to body 138 of mount 130; corresponding elements are identified with the same reference numbers. Differences between body 138 and 138' are described below.

Each brace assembly 186*a*, 186*b* of body 138' includes rigidifying features to reduce deformation thereof. Each support member 188 is formed as a plate, as in body 138, but includes a main portion 200 that faces deformable portion 190 of the corresponding arm 140, and one or more flanges 202 that project transversely from main portion 200. A buttress plate 204 is mounted to main portion 200 near the radially-outer end of the arm, to further strengthen the support member. Support members 188 of each brace assembly are secured to a respective ring 206a, 206b around frame member 60. Each ring includes a bearing 194 that slides on frame member 60 (see FIG. 13).

A single leaf spring 172 may be disposed between brace assemblies 186a, 186b (see FIGS. 11 and 13). The leaf spring is formed by a stack of deformable plates 170 that creates deformable portion 190 of each arm 140.

One or more stop links 208 may be connected to both brace assemblies 186a, 186b to limit the range of travel of the brace assemblies relative to one another (see FIGS. 11 and 12). Despite the rigidifying and strengthening features added to the brace assemblies, a small amount of deformation of these assemblies still can occur. This deformation can change the separation between upper and lower rings 206a, 206b. Each link 208 is connected at opposite ends to the respective brace assemblies with fasteners 210. At least one of the connections is a slidable connection created by a slot 212 elongated parallel to the Z axis.

A pair of stop members 214 may be disposed in each arm 140 between deformable portion 190 and its associated pair of support members 188 (see FIG. 13). The stop members are configured to establish a limit for upward and downward motion of deformable portion 190 within each arm, and for leaf spring 172 within body 138'. Each stop member 214 may be mounted to a support member 188, as shown, or to leaf spring 172.

FIGS. 14-18 show another exemplary embodiment 230 of anti-rotation mount 52 for the systems of Section II. Mount 230 is structured and functions generally as described for mount 130 of FIGS. 4-13, with structurally and/or functionally similar elements labeled with the same reference numbers. For example, mount 230 has X-axis coupling structure 80 and Y-axis coupling structure 82, formed with X-axis slide interfaces 142 and Y-axis slide interfaces 144, as described above for mount 130. Accordingly, movable frame member 60 can move in an XY plane, indicated by arrows at 231 in FIG. 15, by independent movement at a set of X-axis slide interfaces and at a set of Y-axis slide interfaces. However, mount 230 replaces leaf spring 172 and brace assemblies 186a, 186b, with radially arranged pivotable members 232. In other words, arms 140 of body 138 (or 138') are replaced at least in part with pivotable members 232, which may be considered to be pivotable arms.

Pivotable members 232 are configured to undergo coupled pivotal motion that prevents lower frame member 60 from tilting/rocking. Each pivotable member 232 has an outer end pivotably connected to slidable element 148 for single-axis rotation about a respective pivot axis 234. Pivot axes 234 are coplanar with one another and arranged around the central Z axis, with each axis 234 orthogonal to the Z axis. Each pivotable member 232 also has an inner end pivotably connected to lower frame member 60 for single-axis rotation about a respective pivot axis 236. Pivot axes 236 also are coplanar with one another and arranged around the central Z axis, with each axis 236 orthogonal to the Z axis. Pivot axes 234 move radially inward and outward with respect to a central Z axis as slidable elements 148 slide parallel to the X axis and/or Y axis, as described above for mount 130 (see FIGS. 16-18). This arrangement forces symmetrical motion of pivotable members 232, which is generally analogous to the symmetrical deformation of the leaf spring(s) of mount 130. Mount 230 also may include one or more Z-axis biasing members to resiliently bias the position of lower frame member 60 along the Z axis.

IV. Payloads

A payload is any device or collection of devices that is carried and aimed by a gimbal assembly. The payload may include one or more detectors and/or emitters, among others. A detector may create a signal representative of detected energy and/or force, such as electromagnetic radiation, an electric field, a magnetic field, a pressure or pressure difference (e.g., sonic energy), a temperature or temperature difference (e.g., thermal energy), a particle or particles (e.g., high energy particles), movement (e.g., an inertial measurement device), and/or the like. An emitter generally comprises any mechanism for emitting a suitable or desired signal, such as electromagnetic radiation (e.g., via a laser), sonic energy, and/or the like. The payload generally is in communication with a processor that sends signals to and/or receives signals from the payload. The payload may be connected (generally via a processor) to a display such that signals from the payload may be formatted into a visible form for viewing on the display. In some cases, the payload may contain high heat-emitting components, such as lasers, radars, millimeter-wave (MMW) imagers, light detection and ranging (LIDAR) imagers, mine-detection sensors, and/or inertial measurement units (IMUs).

In some embodiments, the payload may form a detection portion of an imaging system. An imaging system generally comprises any device or assembly of devices configured to generate an image, or an image signal, based on received energy, such as electromagnetic radiation. Generally, an imaging system detects spatially distributed imaging energy (e.g., visible light and/or infrared radiation, among others) and converts it to a representative signal. Imaging may involve optically forming a duplicate, counterpart, and/or other representative reproduction of an object or scene, especially using a mirror and/or lens. Detecting may involve recording such a duplicate, counterpart, and/or other representative reproduction, in analog or digital formats, especially using film and/or digital recording mechanisms. Accordingly, an imaging system may include an analog camera that receives radiation (e.g., optical radiation) and exposes film based on the received radiation, thus producing an image on the film. Alternatively, or in addition, an imaging system may include a digital camera that receives radiation (e.g., optical radiation) and generates a digital image signal that includes information that can be used to generate an image that visually portrays the received radiation. Alternatively, or in addition, an imaging system may include an active component such as a laser to illuminate a scene and form an image from one or more reflections of the laser. "Imaging energy," as used herein, may include any type of energy, particularly electromagnetic energy, from which an image can be generated, including but not limited to ultraviolet radiation, visible light, and infrared radiation.

Suitable detectors for an imaging system may include (1) array detectors, such as charge-coupled devices (CCDs), charge-injection devices (CIDs), complementary metal-oxide semiconductor (CMOS) arrays, photodiode arrays, microbolometers, and the like, and/or (2) arrays of point detectors, such as photomultiplier tubes (PMTs), photodiodes, pin photodiodes, avalanche photodiodes, photocells, phototubes, and the like. Detectors may be sensitive to the intensity, wavelength, polarization, and/or coherence of the detected imaging energy, among other properties, as well as spatial and/or temporal variations thereof.

The imaging system also may include optics (i.e., one or more optical elements). Exemplary optical elements may include (1) reflective elements (such as mirrors), (2) refractive elements (such as lenses), (3) transmissive or conductive elements (such as fiber optics or light guides), (4)

diffractive elements (such as gratings), and/or (5) subtractive elements (such as filters), among others.

The imaging system also may contain gyroscopes and/or other elements arranged to form an inertial measurement unit (IMU) on an optical bench. The IMU may be used to assess the pointing angle of the line-of-sight, as well as geo-location, geo-referencing, geo-pointing, and/or geo-tracking in earth coordinates.

In some embodiments, an imaging system may be capable of generating image signals based on two or more different types or wavebands of imaging energy. For example, the imaging system may be configured to generate a first image signal representative of visible light and a second image signal representative of infrared radiation. Visible light and infrared radiation are both types of electromagnetic radiation (see Definitions); however, they are characterized by different wavebands of electromagnetic radiation that may contain or reflect different information that may be used for different purposes. For example, visible light may be used to generate an image signal that in turn may be used to create a photograph or movie showing how a scene appears to a human observer. In contrast, infrared radiation may be used to generate an image signal that in turn may be used to create a heat profile showing heat intensity information for a scene. More generally, the imaging system may be used with any suitable set of first and second (or first, second, and third (and so on)) image signals, using any suitable wavelength bands. These suitable image signals may include first and second visible wavebands, first and second infrared wavebands, mixtures of visible, infrared, and/or ultraviolet wavebands, and so on, depending on the application.

In some examples, an imaging system may form composite images. The composite images may be straight combinations of two or more other images. However, in some cases, one or both of the images may be processed prior to or during the process of combining the images. Composite images may be formed for use in firefighting, aeronautics, surveillance, and/or the like, for example, by superimposing infrared images of hot spots, runway lights, persons, and/or the like on visible images.

The payload alternatively, or in addition, may include non-imaging systems, such as laser rangefinders, laser designators, laser communication devices, polarimeters, hyperspectral sensors, and/or the like.

In some examples, second gimbal 94 supports and encloses payload 76. The payload may include a plurality of optical devices, such as an infrared camera, a video camera for visible light (e.g., a closed-circuit television camera), a laser rangefinder, a light source that serves as a pointer and/or illuminator, or any combination thereof. The second gimbal also may be equipped with one or more optical windows that allow optical radiation to enter or exit the second gimbal, such that the optical radiation can travel to and/or from each optical device of the payload.

V. Support Platforms

The gimbal system of the present disclosure may include a gimbal assembly connected to a support platform by an anti-rotation mount. A support platform, as used herein, generally refers to any mechanism for supporting and/or conveying an anti-rotation mount and a gimbal assembly. The support platform may be movable or fixed in relation to the earth, and may be disposed on the ground, in the air or space, or on and/or in water, among others. In any case, the support platform may be selected to complement the function of the mount and gimbal assembly, and particularly the payload thereof.

The support platform may be movable, such as a vehicle with or without motive power. Exemplary vehicles include a ground vehicle (e.g., a car, truck, motorcycle, tank, etc.), a watercraft (e.g., a boat, submarine, carrier, etc.), an aircraft (e.g., a fixed-wing piloted aircraft, pilotless remote-controlled aircraft, helicopter, missile, dirigible, aerostat balloon, rocket, etc.), or the like. In some cases, the support platform may include a crane or mast, which may provide hydraulic positioning of the support platform The support platform may be fixed in position. Exemplary fixed support platforms may include a building, an observation tower, a wall, a mast, and/or an observation platform, among others.

A gimbal system with a movable or fixed support platform may be used for any suitable application(s). Exemplary applications for a gimbal system include navigation, targeting, search and rescue, law enforcement, firefighting, force protection, and/or surveillance, among others.

VI. Selected Embodiments

This section describes selected embodiments of the present disclosure, presented as a series of numbered paragraphs. These embodiments are intended for illustration only and should not limit the scope of the present disclosure.

A. Selected Embodiments I

Paragraph 1. A gimbal system, comprising: (A) a mounting portion including a first frame member having a fixed relation to a set of mutually orthogonal X, Y, and Z axes and also including a second frame member movably connected to the first frame member by a linkage assembly that resists any rotation of the first frame member and the second frame member relative to one another, the mounting portion including X-axis slide structure and Y-axis slide structure each formed at least partially by the linkage assembly and each permitting axial motion of the frame members relative to one another only substantially parallel to the X axis or only substantially parallel to the Y axis, respectively; and (B) a gimbal assembly connected to and supported by the mounting portion.

Paragraph 2. The gimbal system of paragraph 1, wherein the linkage assembly includes Z-axis slide structure that permits axial motion of the frame members relative to one another only substantially parallel to the Z axis.

Paragraph 3. The gimbal system of paragraph 1, wherein at least a portion of the X-axis slide structure is nested in at least a portion of the Y-axis slide structure.

Paragraph 4. The gimbal system of paragraph 1, wherein the linkage assembly includes one or more leaf springs, and wherein deformation of the one or more leaf springs is coupled to motion of the frame members relative to one another parallel to the Z axis.

Paragraph 5. The gimbal system of paragraph 4, wherein each of the one or more leaf springs is rigidly attached to the second frame member.

Paragraph 6. The gimbal system of paragraph 4 or 5, wherein the one or more leaf springs are included in a plurality of arms arranged radially with respect to the Z axis.

Paragraph 7. The gimbal system of paragraph 6, wherein a radially outer end of each arm is connected to a portion of the X-axis slide structure and/or a portion of the Y-axis slide structure.

Paragraph 8. The gimbal system of paragraph 7, wherein the linkage assembly includes one or more plates each facing the one or more leaf springs and attached to a radially outer end of each arm.

Paragraph 9. The gimbal system of paragraph 8, wherein each plate of the one or more plates supports a bearing for a Z-axis slide structure.

Paragraph 10. The gimbal system of paragraph 9, wherein the bearing contacts a cylindrical region of the second frame member.

Paragraph 11. The gimbal system of any of paragraphs 4 to 10, wherein the one or more leaf springs define a plane that is orthogonal to the Z axis.

Paragraph 12. The gimbal system of any of paragraphs 1 to 3, wherein the linkage assembly includes a plurality of pivotable members arranged at least generally radially with respect to the Z axis and each having a first end and a second end, wherein the first ends of the pivotable members are pivotably connected to a same one of the frame members at respective pivot axes arranged around and orthogonal to the Z axis and coplanar to one another, and wherein the second end of each pivotable member is connected to a portion of the X-axis slide structure and/or a portion of the Y-axis slide structure.

Paragraph 13. The gimbal system of any of paragraphs 1 to 12, wherein the gimbal assembly includes a plurality of gimbals supporting a payload that is orientable with respect to the mounting portion by rotation of the gimbals about a pair of nonparallel (e.g., orthogonal axes).

Paragraph 14. The gimbal system of any of paragraphs 1 to 13, wherein the gimbal assembly includes a plurality of gimbals supporting an image detector.

Paragraph 15. The gimbal system of paragraph 14, wherein the image detector is sensitive to infrared radiation.

Paragraph 16. The gimbal system of paragraph 14 or 15, wherein the image detector is orientable with respect to the mounting portion about a pair of nonparallel axes by rotation of the gimbals.

Paragraph 17. The gimbal system of any of paragraphs 1 to 16, further comprising a processor programmed to control motor-driven rotation of the gimbals.

Paragraph 18. The gimbal system of paragraph 17, wherein the processor is programmed to control motor-driven rotation of the gimbals based on signals from an inertial measurement unit.

Paragraph 19. The gimbal system of paragraph 1, wherein the mounting portion includes one or more vibration isolators and one or more vibration dampers.

Paragraph 20. The gimbal system of paragraph 1, wherein the gimbal assembly supports a payload including a camera.

Paragraph 21. The gimbal system of any of paragraphs 1 to 20, wherein each frame member includes a plate portion that defines a plane, and wherein the planes of the frame members are parallel to one another.

Paragraph 22. The gimbal system of any of paragraphs 1 to 21, wherein the frame members are movable relative to one another parallel to an XY plane substantially only via the X-axis slide structure and the Y-axis slide structure.

Paragraph 23. The gimbal system of any of paragraphs 1 to 22, wherein any axial movement of the frame members relative to one another parallel to the X axis changes a configuration of the X-axis slide structure and parallel to the Y axis changes a configuration of the Y-axis slide structure.

Paragraph 24. The gimbal system of paragraph 23, wherein any axial movement of the frame members relative to one another parallel to the Z axis changes a configuration of a Z-axis slide structure.

B. Selected Embodiments II

Paragraph 1. An imaging system, comprising: (A) a mount comprising (i) a first frame member having a fixed relation to a set of mutually transverse X, Y, and Z axes, (ii) a coupling assembly, (iii) a second frame member connected to the first frame member via the coupling assembly, such that the frame members are not permitted to rotate relative to one another, and (iv) X-axis, Y-axis, and Z-axis coupling structures each formed at least partially by the coupling assembly and permitting axial motion of the frame members relative to one another only substantially parallel to the X axis, Y axis, and Z axis, respectively; and (B) an image detector connected to the mount via the second frame member.

Paragraph 2. The imaging system of paragraph 1, wherein at least a portion of the X-axis coupling structure is nested in at least a portion of the Y-axis coupling structure.

Paragraph 3. The imaging system of paragraph 1 or 2, wherein one of the coupling structures includes a leaf spring.

Paragraph 4. The imaging system of any of paragraphs 1 to 3, wherein the leaf spring is orthogonal to the Z axis.

Paragraph 5. The imaging system of any of paragraphs 1 to 4, wherein the coupling assembly includes a body having a plurality of arms.

Paragraph 6. The imaging system of paragraph 5, wherein the arms are arranged radially with respect to the Z axis.

Paragraph 7. The imaging system of paragraph 5 or 6, wherein an end of each arm forms a portion of the X-axis coupling structure or a portion of the Y-axis coupling structure.

Paragraph 8. The imaging system of any of paragraphs 5 to 7, wherein an end of each arm is slidably received by a bearing or forms a bearing.

Paragraph 9. The imaging system of any of paragraphs 5 to 8, wherein the body includes a deformable portion and a pair of brace assemblies disposed on opposite sides of the deformable portion from one another.

Paragraph 10. The imaging system of paragraph 9, wherein the deformable portion includes a leaf spring.

Paragraph 11. The imaging system of any of paragraphs 1 to 10, wherein the X-axis coupling structure includes a plurality of separate X-axis slide interfaces, and wherein the Y-axis coupling structure includes a plurality of separate Y-axis slide interfaces.

Paragraph 12. The imaging system of paragraph 11, wherein mount defines a central axis that is coaxial to the Z axis, and wherein the central axis is disposed intermediate a pair of the X-axis slide interfaces and intermediate a pair of the Y-axis slide interfaces.

Paragraph 13. The imaging system of any of paragraphs 1 to 12, further comprising a plurality of biasing members configured to bias a position of the second frame member with respect to the first frame member in three dimensions.

Paragraph 14. The imaging system of paragraph 13, further comprising a plurality of dampers configured to damp motion of the frame members relative to one another.

Paragraph 15. The imaging system of any of paragraphs 1 to 14, further comprising a plurality of gimbals supporting the image detector such that the image detector is orientable with respect to the mount by rotation of the gimbals about a pair of nonparallel axes.

Paragraph 16. The imaging system of any of paragraphs 1 to 15, wherein any axial movement of the frame members relative to one another parallel to the X axis changes a configuration of the X-axis coupling structure, parallel to the Y axis changes a configuration of the Y-axis coupling structure, and parallel to the Z axis changes a configuration of the Z-axis coupling structure.

Paragraph 17. The imaging system of any of paragraphs 1 to 16, wherein the first frame member is firmly attached to a vehicle.

Paragraph 18. The imaging system of any of paragraphs 1 to 17, wherein the image detector is disposed under the second frame member.

Paragraph 19. The imaging system of any of paragraphs 1 to 18, wherein the X, Y, and Z axes are mutually orthogonal to one another.

Paragraph 20. An imaging system, comprising: (A) a mount comprising (i) a first frame member having a fixed relation to a set of mutually transverse X, Y, and Z axes, (ii) a coupling assembly including at least one leaf spring, (iii) a second frame member connected to the first frame member via the coupling assembly, such that the frame members are permitted to move relative to one another translationally in three dimensions, and such that the frame members are not permitted to rotate relative to one another, wherein the Z axis is coaxial with a central axis of the mount that extends through both frame members, and wherein deformation of the at least one leaf spring is coupled to movement of the frame members relative to one another parallel to the Z axis; and (B) an image detector connected to the mount via the second frame member.

Paragraph 21. The imaging system of paragraph 20, wherein the at least one leaf spring is orthogonal to the Z axis.

Paragraph 22. The imaging system of paragraph 20 or 21, wherein the coupling assembly includes a body having a plurality of arms, and wherein the at least one leaf spring forms a portion of each arm.

Paragraph 23. The imaging system of paragraph 22, wherein an end of each arm forms a portion of the X-axis coupling structure or a portion of the Y-axis coupling structure.

Paragraph 24. The imaging system of paragraph 22 or 23, wherein the body includes a pair of brace assemblies disposed on opposite sides of the at least one leaf spring from one another.

Paragraph 25. The imaging system of any of paragraphs 20 to 24, further comprising at least one X-axis slide interface and at least one Y-axis slide interface each formed at least partially by the coupling assembly and each permitting axial motion of the frame members relative to one another only substantially parallel to the X axis or only substantially parallel to the Y axis, respectively.

Paragraph 26. The imaging system of any of paragraphs 20 to 25, further comprising a plurality of gimbals supporting the image detector such that the image detector is orientable with respect to the mount by rotation of the gimbals about a pair of nonparallel axes.

Paragraph 27. The imaging system of any of paragraphs 20 to 26, wherein the X, Y, and Z axes are mutually orthogonal to one another.

Paragraph 28. An imaging system, comprising: (A) a mount comprising (i) a first frame member having a fixed relation to a set of mutually transverse X, Y, and Z axes, (ii) a coupling assembly, (iii) a second frame member connected to the first frame member via the coupling assembly, such that the frame members are permitted to move translationally relative to one another in three dimensions, and are not permitted to rotate relative to one another, and (iv) at least one X-axis slide interface and at least one Y-axis slide interface each formed at least partially by the coupling assembly and each permitting axial motion of the frame members relative to one another only substantially parallel to the X axis or only substantially parallel to the Y axis, respectively; and (B) an image detector connected to the mount via the second frame member.

The disclosure set forth above may encompass multiple distinct inventions with independent utility. Although each of these inventions has been disclosed in its preferred form(s), the specific embodiments thereof as disclosed and illustrated herein are not to be considered in a limiting sense, because numerous variations are possible. The subject matter of the inventions includes all novel and nonobvious combinations and subcombinations of the various elements, features, functions, and/or properties disclosed herein. The following claims particularly point out certain combinations and subcombinations regarded as novel and nonobvious. Inventions embodied in other combinations and subcombinations of features, functions, elements, and/or properties may be claimed in applications claiming priority from this or a related application. Such claims, whether directed to a different invention or to the same invention, and whether broader, narrower, equal, or different in scope to the original claims, also are regarded as included within the subject matter of the inventions of the present disclosure. Further, ordinal indicators, such as first, second, or third, for identified elements are used to distinguish between the elements, and do not indicate a particular position or order of such elements, unless otherwise specifically stated.

We claim:

1. An imaging system, comprising:
    a mount comprising
        a first frame member having a fixed relation to a set of mutually transverse X, Y, and Z axes,
        a coupling assembly,
        a second frame member connected to the first frame member via the coupling assembly, such that the frame members are not permitted to rotate relative to one another, and
        X-axis, Y-axis, and Z-axis coupling structures each formed at least partially by the coupling assembly and permitting axial motion of the frame members relative to one another only substantially parallel to the X axis, Y axis, and Z axis, respectively, wherein at least a portion of the X-axis coupling structure is nested in at least a portion of the Y-axis coupling structure; and
    an image detector connected to the mount via the second frame member.

2. The imaging system of claim 1, wherein one of the coupling structures includes a leaf spring, and wherein the leaf spring is orthogonal to the Z axis.

3. The imaging system of claim 1, wherein the coupling assembly includes a body having a plurality of arms, wherein an end of each arm forms a portion of the X-axis coupling structure or a portion of the Y-axis coupling structure, and wherein an end of each arm is slidably received by a bearing or forms a bearing.

4. The imaging system of claim 1, further comprising:
    a plurality of biasing members configured to bias a position of the second frame member with respect to the first frame member in three dimensions, and
    a plurality of dampers configured to damp motion of the frame members relative to one another.

5. The imaging system of claim 1, further comprising a plurality of gimbals supporting the image detector such that the image detector is orientable with respect to the mount by rotation of the gimbals about a pair of nonparallel axes.

6. The imaging system of claim 1, wherein any axial movement of the frame members relative to one another parallel to the X axis changes a configuration of the X-axis coupling structure, parallel to the Y axis changes a configuration of the Y-axis coupling structure, and parallel to the Z axis changes a configuration of the Z-axis coupling structure.

7. The imaging system of claim 1, wherein the first frame member is firmly attached to a vehicle, wherein the image detector is disposed under the second frame member, and wherein the X, Y, and Z axes are mutually orthogonal to one another.

8. An imaging system, comprising:
a mount comprising
a first frame member having a fixed relation to a set of mutually transverse X, Y, and Z axes,
a coupling assembly including at least one leaf spring,
a second frame member connected to the first frame member via the coupling assembly, such that the frame members are permitted to move relative to one another translationally in three dimensions, and such that the frame members are not permitted to rotate relative to one another,
wherein the Z axis is coaxial with a central axis of the mount that extends through both frame members, and
wherein deformation of the at least one leaf spring is coupled to movement of the frame members relative to one another parallel to the Z axis; and
an image detector connected to the mount via the second frame member.

9. The imaging system of claim 8, wherein the at least one leaf spring is orthogonal to the Z axis.

10. The imaging system of claim 8, wherein the coupling assembly includes a body having a plurality of arms, and wherein the at least one leaf spring forms a portion of each arm.

11. The imaging system of claim 10, wherein an end of each arm forms a portion of the X-axis coupling structure or a portion of the Y-axis coupling structure.

12. The imaging system of claim 10, wherein the body includes a pair brace assemblies disposed on opposite sides of the at least one leaf spring from one another.

13. The imaging system of claim 8, further comprising at least one X-axis slide interface and at least one Y-axis slide interface each formed at least partially by the coupling assembly and each permitting axial motion of the frame members relative to one another only substantially parallel to the X axis or only substantially parallel to the Y axis, respectively.

14. The imaging system of claim 8, further comprising a plurality of gimbals supporting the image detector such that the image detector is orientable with respect to the mount by rotation of the gimbals about a pair of nonparallel axes.

15. The imaging system of claim 8, wherein the X, Y, and Z axes are mutually orthogonal to one another.

16. An imaging system, comprising:
a mount comprising
a first frame member having a fixed relation to a set of mutually transverse X, Y, and Z axes,
a coupling assembly,
a second frame member connected to the first frame member via the coupling assembly, such that the frame members are permitted to move translationally relative to one another in three dimensions, and are not permitted to rotate relative to one another, and
a plurality of separate X-axis slide interfaces and a plurality of separate Y-axis slide interfaces, wherein each of the X-axis and Y-axis slide interfaces are formed at least partially by the coupling assembly and permit axial motion of the frame members relative to one another only substantially parallel to the X axis or only substantially parallel to the Y axis, respectively, wherein the mount defines a central axis that is coaxial to the Z axis, and wherein the central axis is disposed intermediate a pair of the X-axis slide interfaces and intermediate a pair of the Y-axis slide interfaces; and
an image detector connected to the mount via the second frame member.

17. The imaging system of claim 16, wherein the coupling assembly comprises a leaf spring, wherein deformation of the leaf spring is coupled to movement of the frame members relative to one another parallel to the Z axis.

18. An imaging system, comprising:
a mount comprising
a first frame member having a fixed relation to a set of mutually transverse X, Y, and Z axes,
a coupling assembly comprising a body having a plurality of arms, a deformable portion, and a pair of brace assemblies disposed on opposite sides of the deformable portion from one another, wherein the arms are arranged radially with respect to the Z axis, and wherein the deformable portion includes a leaf spring,
a second frame member connected to the first frame member via the coupling assembly, such that the frame members are not permitted to rotate relative to one another, and
X-axis, Y-axis, and Z-axis coupling structures each formed at least partially by the coupling assembly and permitting axial motion of the frame members relative to one another only substantially parallel to the X axis, Y axis, and Z axis, respectively; and
an image detector connected to the mount via the second frame member.

19. The imaging system of claim 18, wherein the X-axis coupling structure includes a plurality of separate X-axis slide interfaces, wherein the Y-axis coupling structure includes a plurality of separate Y-axis slide interfaces, wherein the mount defines a central axis that is coaxial to the Z axis, and wherein the central axis is disposed intermediate a pair of the X-axis slide interfaces and intermediate a pair of the Y-axis slide interfaces.

20. The imaging system of claim 18, wherein at least a portion of the X-axis coupling structure is nested in at least a portion of the Y-axis coupling structure.

* * * * *

UNITED STATES PATENT AND TRADEMARK OFFICE
CERTIFICATE OF CORRECTION

PATENT NO. : 10,375,311 B2
APPLICATION NO. : 15/689977
DATED : August 6, 2019
INVENTOR(S) : Stephen W. Zeise et al.

Page 1 of 1

It is certified that error appears in the above-identified patent and that said Letters Patent is hereby corrected as shown below:

On the Title Page

Under Related U.S. Application Data heading, change "(63) Continuation of application No. 62/133,773, filed on Mar. 16, 2015." to --(63) Continuation of application No. PCT/US2016/022705, filed on Mar. 16, 2016.--

Under Related U.S. Application Data heading, add --(60) Provisional application No. 62/133,773, filed on Mar. 16, 2015.--

In the Specification

At Column 1, Lines 7 and 8, change "Application No. PCT/US2016/022705 PCT/EP2016/022705 filed Mar. 16, 2016" to --Application No. PCT/US2016/022705 filed Mar. 16, 2016--

At Column 4, Lines 65 and 66, change "anti-rotation mount, (I11) exemplary" to --anti-rotation mount, (III) exemplary--

At Column 11, Line 48, change "independently of axiar motion" to --independently of axial motion--

In the Claims

At Column 21, Line 33, change "includes a pair brace assemblies" to --includes a pair of brace assemblies--

Signed and Sealed this
Twelfth Day of November, 2019

Andrei Iancu
*Director of the United States Patent and Trademark Office*